US008839330B2

(12) United States Patent
Goto et al.

(10) Patent No.: US 8,839,330 B2
(45) Date of Patent: Sep. 16, 2014

(54) MOVING-PICTURE IMAGE DATA-DISTRIBUTION METHOD

(75) Inventors: Yoshimitsu Goto, Yokohama (JP); Toshiaki Kakii, Yokohama (JP); Yoichi Hata, Yokohama (JP); Yasuhito Fujita, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 105 days.

(21) Appl. No.: 13/061,298

(22) PCT Filed: Aug. 6, 2009

(86) PCT No.: PCT/JP2009/063954
§ 371 (c)(1),
(2), (4) Date: Jun. 2, 2011

(87) PCT Pub. No.: WO2010/024102
PCT Pub. Date: Mar. 4, 2010

(65) Prior Publication Data
US 2011/0239264 A1    Sep. 29, 2011

(30) Foreign Application Priority Data

Aug. 28, 2008  (JP) ................................ 2008-220027

(51) Int. Cl.
*H04N 21/4788* (2011.01)
*H04L 29/06* (2006.01)
(Continued)

(52) U.S. Cl.
CPC ............. *H04N 7/15* (2013.01); *H04N 21/4788* (2013.01); *H04L 65/607* (2013.01); *H04N 21/6373* (2013.01); *H04N 19/00266* (2013.01); *H04L 65/403* (2013.01); *H04N 21/44209* (2013.01); *H04N 21/4424* (2013.01); *H04N 21/6582* (2013.01); *H04N 19/00127* (2013.01); *H04N 19/00751* (2013.01); *H04N 19/00206* (2013.01); *H04L 65/80* (2013.01); *H04N 21/4516* (2013.01)
USPC ........................................................ 725/114

(58) Field of Classification Search
USPC ................. 375/240, 240.01, 240.12; 725/114
See application file for complete search history.

(56) References Cited

U.S. PATENT DOCUMENTS 5,847,763 A * 12/1998 Matsumura et al. ...... 375/240.15
5,903,734 A *  5/1999 Chida ........................... 709/232
(Continued)

FOREIGN PATENT DOCUMENTS

CN      1205151 A     1/1999
EP      0854652 A1    7/1998
(Continued)

OTHER PUBLICATIONS

European Search Report for EP Patent Application No. 09809756.1 dated Feb. 7, 2013.
(Continued)

*Primary Examiner* — Larry Donaghue
*Assistant Examiner* — Deforrest Bailey
(74) *Attorney, Agent, or Firm* — McDermott Will & Emery LLP

(57) ABSTRACT

The present invention relates to a moving-picture image data-distribution method that suppresses increases in processing loads at respective information terminals without being affected by an uneven distribution status of processing loads that changes over time or by a bandwidth status of a connected network. During a distribution operation of moving-picture image data from transmission-side information terminals (120, 130) to a reception-side information terminal (110), when the reception-side information terminal (110) repetitively issues a transmission requirement for moving-picture image data at a predetermined time interval to the transmission-side information terminals (120, 130), the reception-side information terminal (110) calculates, in advance, at least any one data amount of an own receivable amount of image frames and an own permissible load amount as reception-limit information, and subsequently sequentially notifies the transmission-side information terminals (120, 130) of an upper limit of at least any one of the data amount and a data structural element that is used as a basis for calculation of the data amount.

5 Claims, 9 Drawing Sheets

(51) Int. Cl.
*H04N 21/6373* (2011.01)
*H04N 19/172* (2014.01)
*H04N 7/15* (2006.01)
*H04N 21/442* (2011.01)
*H04N 21/658* (2011.01)
*H04N 19/132* (2014.01)
*H04N 19/587* (2014.01)
*H04N 19/156* (2014.01)
*H04N 21/45* (2011.01)

(56) References Cited

U.S. PATENT DOCUMENTS

| | | | |
|---|---|---|---|
| 6,553,423 B1 | 4/2003 | Chen | |
| 7,006,575 B2 * | 2/2006 | Yamaguchi et al. | 375/240.26 |
| 7,315,898 B2 * | 1/2008 | Kohno | 709/230 |
| 7,558,323 B2 * | 7/2009 | Aikawa et al. | 375/240.25 |
| 2003/0212810 A1 * | 11/2003 | Tsusaka et al. | 709/231 |
| 2005/0244070 A1 * | 11/2005 | Itakura | 382/248 |
| 2006/0268300 A1 * | 11/2006 | Suzuki | 358/1.9 |
| 2011/0211631 A1 * | 9/2011 | Kimoto | 375/240.01 |

FOREIGN PATENT DOCUMENTS

| | | | | |
|---|---|---|---|---|
| JP | 07-074830 | | 3/1995 | |
| JP | 11-161571 | | 6/1999 | |
| JP | 2001-204002 | | 7/2001 | |
| JP | 2001-251621 | | 9/2001 | |
| JP | 2003-078893 | * | 3/2003 | H04N 7/14 |
| JP | 2005-094045 | | 4/2005 | |
| JP | 2005-341347 | * | 12/2005 | H04N 7/15 |
| JP | 2006-174045 | | 6/2006 | |
| WO | WO 98/06222 | | 2/1998 | |
| WO | WO-2008051681 A1 | | 5/2008 | |

OTHER PUBLICATIONS

Office Action issued Nov. 30, 2012 in counterpart CN Patent Application No. 200980133988.6.

English Translation of International Preliminary Report on Patentability and Written Opinion of the International Searching Authority issued in International Patent Application No. PCT/JP2009/063954, mailed Apr. 21, 2011.

* cited by examiner (a)

(b)

(a)

(b)

(c)

(a)

(b)

(a)

(b)

MOVING-PICTURE IMAGE DATA-DISTRIBUTION METHOD

TECHNICAL FIELD

The present invention relates to a moving-picture image data-distribution method which is applicable to a bidirectional data communication system such as a video teleconference system constituted by a plurality of information terminals interconnected via a network and which distributes moving-picture image data included in visual information transmitted and received among the respective information terminals.

BACKGROUND ART

Communication speeds in data communication lines have increased dramatically in recent years. Accordingly, transmission/reception of large-capacity visual information including moving-picture image data and audio data is now regularly performed even among information terminals such as individually-owned personal computers (hereinafter referred to as PCs) and the like. Particularly, in such a communication environment, a system that realizes real-time bidirectional data communication can be easily built. The area (a) in FIG. 1 is a view showing a configuration of a bidirectional data communication system such as a video teleconference system that can be built utilizing existing network resources including a network line and an information terminal such as a PC. The bidirectional data communication system comprises a network 100, and a plurality of information terminals (terminal A 110, terminal B 120, and terminal C 130) individually connected to the network 100. In addition, transmission/reception 100a (including transmission requirement and data distribution) of visual information such as moving-picture image data is performed via the network 100 between the terminal A 110 and the terminal B 120 which constitute a part of the system. In a similar manner, transmission/reception 100b of visual information such as moving-picture image data is performed via the network 100 between the terminal A 110 and the terminal C 130. Transmission/reception 100c (including transmission requirement and data distribution) of visual information such as moving-picture image data is performed via the network 100 between the terminal B 120 and the terminal C 130. Moreover, the terminal A 110 comprises a control unit 110a (which corresponds to a CPU in a PC), the terminal B 120 comprises a control unit 120a, and the terminal C 130 comprises a control unit 130a. Actual communication control and various digital processing are performed by the control units 110a to 130a.

However, under present circumstances, when distributing a vast amount of moving-picture image data using limited network resources, the data amount itself must be reduced due to limitations in processing capacities of the respective information terminals, network line speed, and the like. Therefore, techniques for compressing moving-picture image data and audio data to be distributed are being actively studied and commercialized. For example, Patent Document 1 discloses an image communication technique for enabling image data transmission/reception suited to a communication environment in accordance with a terminal type of a reception-side client or the like without imposing an inordinate burden on an operator or respective information terminals. On the other hand, Patent Document 2 discloses an encoding apparatus that utilizes scalability, a method and a program thereof, and the like as a system that realizes information updatability with respect to a resolution direction.

In addition, Patent Document 3 discloses a technique that enables data communication suited to individual communication environments between a server and a reception-side client. In other words, when a network line speed between the server and the reception-side client is low with respect to quality of image data transmitted from the server, image data whose quality corresponds to a requirement from the reception-side client is transmitted from the server to the reception-side client.

CITATION LIST

Patent Document

Patent Document 1: Japanese Patent Application Laid-Open No. 2006-174045
Patent Document 2: Japanese Patent Application Laid-Open No. 2005-094054
Patent Document 3: Japanese Patent Application Laid-Open No. 11-161571

DISCLOSURE OF THE INVENTION

Problems that the Invention is to Solve

The present inventors have examined conventional moving-picture image data-distribution method, and as a result, have discovered the following problems.

That is, conventional bidirectional data communication systems in which visual information is transmitted/received among a plurality of information terminals are being replaced by PC systems that utilize broadband. However, since fees for broadband used when distributing moving-picture image data and audio data are relatively low, there is a reality that control of a data amount to be distributed and the like may not have been taken into consideration. At a glance, it would seem that this should pose no problems in broadband environments that offer increasingly higher speeds. However, the current situation cannot be overlooked where, due to nonuniform data processing capacities of the respective information terminals, failures tend to occur in bidirectional data communication among information terminals with different capacities. For example, when moving-picture image data is distributed from a PC with a high processing speed to a PC with a low processing speed, the data received at the PC with a low processing speed may surpass the processing capacity of the PC.

In addition, while moving-picture distribution techniques such as H.264 (MPEG-4 AVC; hereinafter, these next-generation image compression techniques will simply and collectively be referred to as an MPEG system) which have recently been coming into use enable a transmission-side information terminal to change the number of frames in a certain period of time, real-time processing cannot be performed as exemplified by a delay that occurs between a change made to the number of frames and a transmission of the frames in the event frames are transmitted when processing is enabled in response to a requirement from a reception-side information terminal.

More specifically, it is empirically obvious that stress-free network communication cannot be solely achieved by load management of network resources in a communication environment where, as shown in the area (a) of FIG. 1, connecting the information terminals 110 to 130 that are individually-owned PCs and the like to the existing network 100 enables a bidirectional data communication system involving a plurality of persons to be readily built.

A major reason is that background processing is performed separate from bidirectional data communication at the respective information terminals. In other words, as shown in the area (b) of FIG. 1, a processing load (CPU utilization) at each of the terminals A 110 to C 130 interconnected via the network 100 constantly changes over time. For example, in the area (b) of FIG. 1, at time T1, a processing load on the terminal A 110 is on a declining trend and a certain amount of load with respect to data transmission/reception processing is permissible. The terminal B 120 has a sufficient permissible processing load. On the other hand, a processing load on the terminal C 130 at time T1 is significantly high and a load for processing data transmission/reception cannot be newly permitted. In addition, at time T2, while the processing load at the terminal A 110 is high, the processing loads at the terminal B 120 and the terminal C 130 are low. Therefore, it is obvious that the decline in the processing capacity of the terminal A 110 will become a bottleneck in bidirectional data communication among the terminal A 110, the terminal B 120, and the terminal C 130. Furthermore, at time T3, the processing load at the terminal A 110 is low but the processing loads at the terminal B 120 and the terminal C 130 are high. In this case, the respective declines in the processing capacities of the terminal B 120 and the terminal C 130 will become bottlenecks in bidirectional data communication among the terminal A 110, the terminal B 120, and the terminal C 130.

As described above, when bidirectional data communication of a certain amount of visual information is performed while disregarding respective load conditions at the terminal A 110, the terminal B 120, and the terminal C 130 which are interconnected via the network, the processing capacity of the PC at the information terminal that is a bottleneck is surpassed and a disturbance or the like occurs in video displayed on a monitor or audio outputted from a speaker. In other words, since a transmission-side terminal continues data transmission while disregarding a processing status of image data or audio data at a reception-side terminal, a lag occurs in video reproduction processing by the reception-side information terminal. A lag also occurs in video reproduction processing by the reception-side information terminal when the processing load on the transmission-side information terminal conversely increases. For example, in Patent Document 3 described above, the number of information terminals that become distribution targets of a server constantly changes over time. Therefore, at the peak of processing (when there are transmission requirements from a plurality of information terminals), a limit of the processing capacity of the server is surpassed and a transmission delay of image data from the server in turn causes a delay in image reproduction processing at a reception-side information terminal.

Moreover, in addition to processing for encoding, decoding, and displaying of image frames as described above, a processing load at each information terminal includes a processing load caused when retrieving data received via a network (which is temporarily stored in a communication buffer) from the buffer. Normally, at an information terminal such as a PC, data received via a network is temporarily stored in a communication buffer by software, whereby the stored data is retrieved by application software and subjected to predetermined processing. At this point, as a processing load on the information terminal increases, it takes more time for the application software to retrieve a packet electrically delivered to a communication I/O unit such as a PC network card. In this case, a state that is substantially a buffer overflow occurs and causes retrieval failure of received data.

The present invention has been developed to eliminate the problems described above. It is an object of the present invention to provide a moving-picture image data-distribution method comprising a structure which enables real-time moving-picture image distribution without being affected by an uneven distribution of processing load among a plurality of information terminals interconnected via a network and by a bandwidth status of the network that the connects the information terminals.

Means for Solving the Problems

A moving-picture image data-distribution method according to the present invention is applicable to a bidirectional data communication system such as a video teleconference system comprising a plurality of information terminals interconnected via a network. Therefore, each of the information terminals interconnected via the network can be both a reception destination and a transmission source with respect to moving-picture image data distributed over the network.

In this case, besides moving-picture image data and voices of operators or the like of the respective information terminals, visual information to be transmitted/received in the bidirectional data communication system includes still image data, text data, and other information that may contribute to bidirectional communication. In particular, since moving-picture image data included in visual information is subjected to encoding (data compression) and decoding (data decompression) during a transmission/reception operation at each information terminal, the efficiency of a distribution operation of the moving-picture image data is heavily dependent on the data processing capacity of each information terminal. The moving-picture image data-distribution method according to the present invention is characterized in that a data distribution operation is controlled by a reception-side information terminal. Therefore, moving-picture image data that is applied in the moving-picture image data-distribution method is favorably moving-picture image data having either a frame structure where respective image frames may be compressed/decompressed independently from adjacent image frames without being compressed in a time axis direction or a frame structure where a specific image frame group can be reproduced independently from a previous or next image frame group (compression in a time axis direction by inter-frame prediction performed between a plurality of image frames constituting a single image frame group is acceptable).

In order to actively utilize the characteristics of the frame structures described above, moving-picture image data that may become a distribution object according to the present invention is suitably moving-picture image data according to the Motion-JPEG (or Motion-JPEG 2000) system in which respective image frames are compressed pursuant to the JPEG (or JPEG 2000) standard that is primarily well-known as a still image compression system. In other words, a total data amount of moving-picture image data to be transmitted/received is not simply determined by the number of image frames transmitted/received as data structural elements but is determined by "number of image frames"ב"image resolution (size)"ב"number of bits expressing one pixel". However, at least any of the number of image frames, image resolution, and the number of bits expressing one pixel need only be controlled in order to increase/decrease the total amount of data. In particular, controlling the number of image frames is effective. In this light, moving-picture image data according to the JPEG system that enables compression/decompression of individual image frames without being compressed in a time axis direction is particular effective because even when an image frame is arbitrarily dropped, encoding of remaining image frames is not affected.

However, the MPEG system that enables compression in a time axis direction by utilizing differential information between previous and next adjacent image frames or the like is also included in moving-picture image data that may become a distribution object according to the present invention. For example, moving-picture image data according to the MPEG system where an I-frame, which involves individually encoding each image frame, is specified as a reference frame in inter-frame prediction is also included in moving-picture image data that may become a distribution object according to the present invention. Furthermore, in a case where a combination of an I-frame and a P-frame is specified as a reference frame in inter-frame prediction, a total of three image frames including a single image frame specified as an I-frame and two image frames specified as P-frames can be handled as a frame group to be a single handling unit (transmission/reception unit). Moving-picture image data having a frame structure constituted by such frame groups can also become a distribution object according to the present invention. Moreover, in inter-frame prediction according to the MPEG system, for example, an I-frame that uses individual encoding of each image frame, a B-frame that is encoded using preceding and following frames, and a P-frame that is encoded using a preceding frame can be specified as a reference frame.

Moving-picture image data according to the Motion-JPEG (or Motion-JPEG 2000) system described above is not compressed in a time axis direction and therefore has lower compression efficiency at a same bit rate as compared to moving-picture image data according to the MPEG system. However, due to characteristics such as enabling an arbitrary image frame to be separated from other image frames so as to be individually edited, the Motion-JPEG (or Motion-JPEG 2000) system is adopted as an output format by individual-use video capture cards and the like.

Particularly, in accordance with the moving-picture image data-distribution method according to the present invention, moving-picture image data such as described above (moving-picture image data having a frame structure constituted by image frames or frame groups that can be individually reproduced along a time axis direction) is transmitted/received among a plurality of information terminals interconnected via a network. For example, in the moving-picture image data-distribution method according to the present invention, as a mode of bidirectional data communication among a plurality of information terminals, a reception-side information terminal and a transmission-side information terminal issue a transmission requirement and distribute image frames according to data amounts that can be processed by each other during a distribution operation of moving-picture image data from the transmission-side information terminal to the reception-side information terminal.

In other words, when repetitively issuing a moving-picture image data-transmission requirement to the transmission-side information terminal being a transmission source at a predetermined time interval such as a regular time interval, the reception-side information terminal calculates a receivable data amount at the moment where the transmission requirement is issued. Subsequently, the reception-side information terminal sequentially notifies the transmission-side information terminal of an upper limit of at least any one of the calculated data amount and a data structural element that is used as a basis for calculation of the data amount, as reception-limit information. Meanwhile, the transmission-side information terminal having received the transmission requirement transmits, following instructions in the received reception-limit information, moving-picture image data whose data amount is limited in accordance with at least one of or, favorably, whichever is less, of a data amount that falls within an own permissible load range at the moment where the transmission requirement had been received and the data amount requested by the reception-side information terminal, to the reception-side information terminal that has issued the transmission requirement.

In particular, the receivable data amount calculated by the reception-side information terminal is favorably at least any one data amount of a receivable image frame amount attributable to network band limitation and an own permissible load amount for image frame display processing. More favorably, the receivable data amount is whichever data amount is less of the aforementioned receivable image frame amount and the aforementioned permissible load amount. In this manner, by arranging whichever is less of a network band limitation and an information terminal processing capacity to be selectable, the present invention can function effectively not only with respect to load balancing of the reception-side information terminal but also to a network load state.

Furthermore, prior to distribution of moving-picture image data, as described above, reception-limit information that is transmitted from the reception-side information terminal to the transmission-side information terminal includes at least any one of an upper limit of a data amount, which is calculated in consideration of at least one of network band limitation and an own permissible load for image frame display processing, and an upper limit of a frame component that had been used as a basis for calculation of the data amount. Moreover, the frame component includes at least any one of the number of transmission/reception units per unit time regarding image frames, image resolution, and the number of bits per pixel.

Since a transmission/reception data amount (controlled by increasing/reducing the number of image frames and the like) of moving-picture image data that is a distribution object that takes into consideration processing loads of both the reception-side information terminal and the transmission-side information terminal is dynamically determined in a moving-picture image data distribution operation, the processing load on each of a plurality of information terminals (each information terminal can become both a reception-side information terminal or a transmission-side information terminal) interconnected via a network can be reduced. However, when controlling a transmission/reception data amount by increasing/reducing the number of image frames, since moving-picture image data is distributed within a permissible limit of processing loads of both the reception-side and transmission-side information terminals, there may be cases where an intermediate image frame is not received during moving-picture display at the reception-side information terminal. In addition, there may be cases where an intermediate image frame is not transmitted (a transmission operation is skipped) during image distribution at an arbitrary timing by the transmission-side information terminal. In the moving-picture image data-distribution method according to the present invention, in preliminary consideration of a dropped image frame attributable to the processing state of both reception-side and transmission-side information terminals, moving-picture image data favorably has a frame structure in a still image format (for example, the JPEG 2000 standard) instead of a moving picture format such as H.264 so as to enable video display at the reception-side information terminal.

However, when an image frame is transmitted from the transmission-side information terminal to the reception-side information terminal at an arbitrary timing, simply notifying the number of image frames within a permissible limit of processing loads of both the reception-side and transmission-side information terminals cannot synchronize the plurality of information terminals and a possibility cannot be denied where moving-picture image data is transmitted from the respective information terminals in an asynchronous state. In order to describe such a situation in concrete terms, a case will be considered where, for example, the terminal A 110 respectively issues a moving-picture image data-transmission requirement to the terminal B 120 and the terminal C 130 as shown in the area (a) of FIG. 2. In this case, when the terminal B 120 and the terminal C 130 having received the transmission requirement from the terminal A 110 each transmits requested image frames at its own timing to the terminal A 110, the reception-side terminal A 110 is unable to control reception timings. Therefore, as shown in the area (b) in FIG. 2, there is a risk that the processing load on the terminal A 110 may increase significantly or a transmission conflict situation may occur in the network at timings T5 and T6. In this case, a situation may occur where display processing cannot be completed due to data loss. Then, in the moving-picture image data-distribution method according to the present invention, as shown in the area (c) in FIG. 2, synchronization in a one-to-many data transmission/reception mode is achieved by granting control over moving-picture image data distribution timings to the reception-side information terminal.

Particularly, in a moving-picture image data distribution operation from two or more transmission-side information terminals to a reception-side information terminal as a mode of bidirectional data communication among a plurality of information terminals, the reception-side information terminal transmits a transmission requirement signal to at least any one of the two or more transmission-side information terminals at an own timing where image frame display processing can be performed. On the other hand, among the two or more transmission-side information terminals described above, only the transmission-side information terminal having received the transmission requirement signal transmitted at an own timing of the reception-side information terminal itself transmits, to the reception-side information terminal, moving-picture image data of a data amount requested by the reception-side information terminal. In this case, the transmission-side information terminal not having received a transmission requirement to the information terminal itself enters a transmission stand-by state of moving-picture image data until a transmission requirement to the information terminal itself is received.

Moreover, in the moving-picture image data-distribution method according to the present invention, when the moving-picture image data is constituted by image frames each of which can be reproduced independently from a previous image frame without being compressed in a time axis direction or, in other words, when an I-frame is specified in inter-frame prediction even when the moving-picture image data is in accordance with the JPEG system or the MPEG system, the transmission/reception units regarding image frames correspond to the respective image frames constituting the moving-picture image data. In this case, moving-picture image data refers to a data group which includes a plurality of image frames that are sequentially switched over at a certain timing. Therefore, moving-picture image data that may become a distribution object includes an image data group prepared for switching over slides in a slide show of PowerPoint and the like.

In addition, when the moving-picture image data is constituted by a plurality of frame groups each of which includes a plurality of image frames and can be reproduced independently from a previously-positioned image frame in a time axis direction or, in other words, when the moving-picture image data is constituted by a plurality of frame groups obtained by combining an I-frame and a P-frame or combining an I-frame, a P-frame, and a B-frame (frame groups which can be reproduced independently from adjacent image frames), the transmission/reception units regarding image frames correspond to the respective frame groups constituting the moving-picture image data.

Furthermore, in the moving-picture image data-distribution method according to the present invention, each of the plurality of information terminals favorably notifies, in advance prior to transmission of the moving-picture image data, other information terminals of transmission-limit information that indicates an upper limit of the number of transmission/reception units regarding image frames which can be transmitted per unit time when the information terminal itself becomes a transmission source of the moving-picture image data. By arranging an upper limit of the number of transmittable image frames or the like to be settable in advance at each information terminal that may become a transmission-side information terminal, a reception-side information terminal is to set the number of frames within this upper limit. Consequently, an increase in the processing load on a reception-side information terminal due to moving-picture image data being sent to the reception-side information terminal while disregarding load status can be avoided and, at the same time, the processing load on a transmission-side information terminal can be reduced. Moreover, both reception-side and transmission-side information terminals can actively manage a moving-picture image data distribution operation such as the reception-side information terminal issuing a transmission requirement to the transmission-side information terminal only when it is determined that moving-picture image data transmitted from the transmission-side information terminal can be processed while managing its own data processing (background data processing) in addition to the number of image frames to be video-displayed.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

Effects of the Invention

In accordance with the moving-picture image data-distribution method according to the present invention, an upper limit of the number of image frames or the like of moving-picture image data to be distributed can be dynamically adjusted according to an uneven distribution status of processing loads of a plurality of information terminals interconnected via a network. Therefore, moving-picture image data can be distributed in real-time without being affected by an uneven distribution of processing loads among the plurality of information terminals.

In addition, as moving-picture image data to be transmitted/received, the moving-picture image data-distribution method according to the present invention adopts moving-picture image data either constituted by image frames or frame groups that can be reproduced independently from adjacent image frames without being compressed in a time axis direction as represented by moving-picture image data according to the Motion-JPEG system in which image frames are compressed/decompressed according to the JPEG standard. By adopting moving-picture image data having such a structure as a transmission/reception object, even frequently occurring increases/reductions in the number of image frames or the like constituting the moving-picture image data are unlikely to have a significant impact on real-time moving-picture image data distribution among the respective information terminals. Therefore, by dynamically adjusting the number of image frames or the like per unit time of moving-picture image data to be transmitted/received according to an increase/reduction of processing loads at the respective information terminals, moving-picture image data can be distributed in a stress-free manner among the respective information terminals.

BEST MODES FOR CARRYING OUT THE INVENTION

Figure 1:
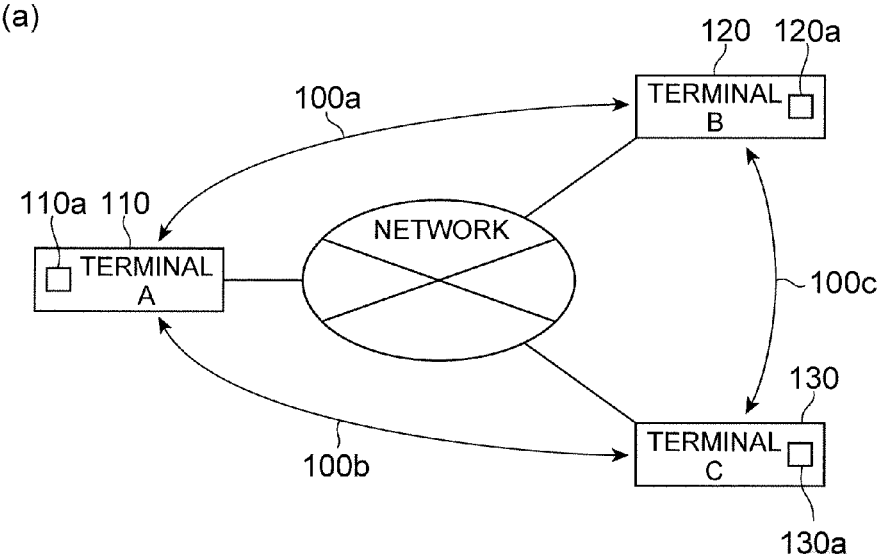
FIG. 1 is a view for explaining a configuration of a general bidirectional data communication system among a plurality of information terminals and a change over time of processing loads at the respective information terminals.
Figure 1:
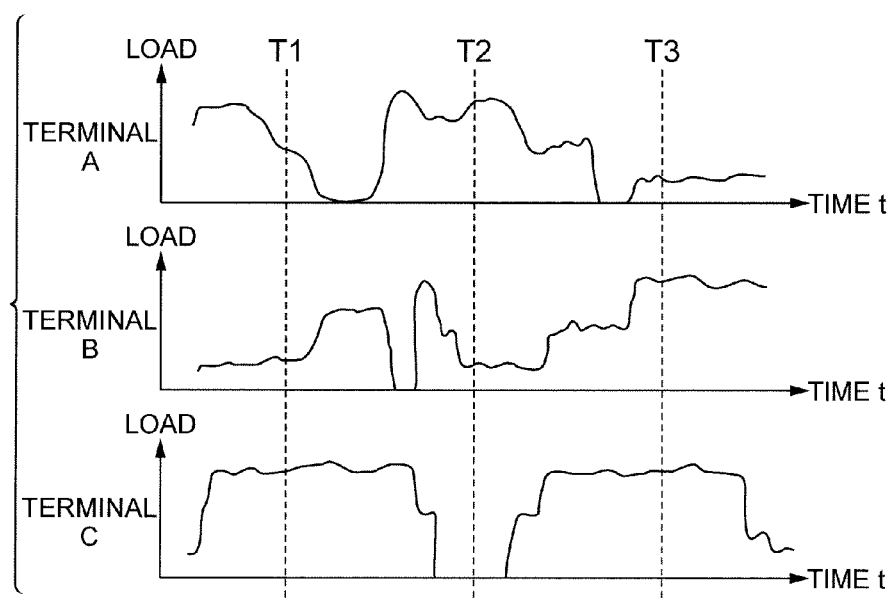

In the following, embodiments of a visual information distribution method according to the present invention will be explained in detail with reference to FIGS. 3 to 9. Moreover, when necessary, FIGS. 1 and 2 will also be referred to in the description of the respective embodiments. In the description of the drawings, identical or corresponding components are designated by the same reference numerals, and overlapping description is omitted.

Figure 2:
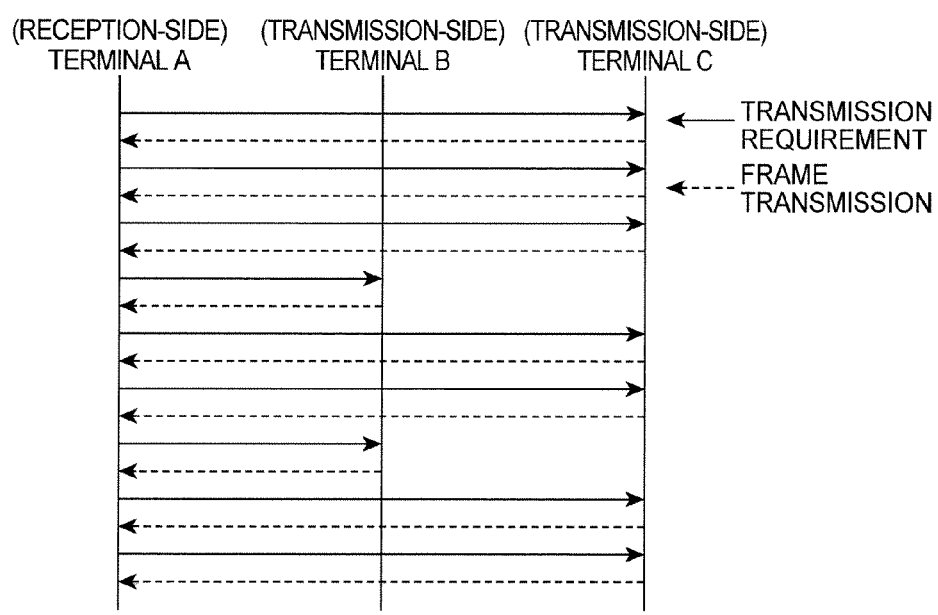
FIG. 2 is a view for schematically explaining a representative advantage of a moving-picture image data-distribution method according to the present invention.
Figure 2:
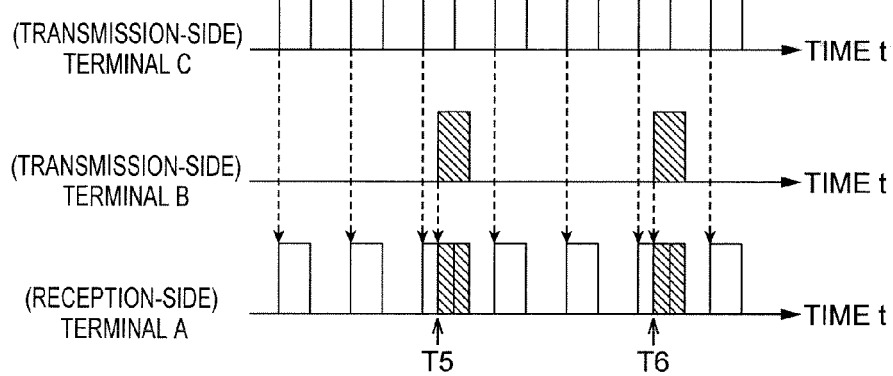
Figure 2:
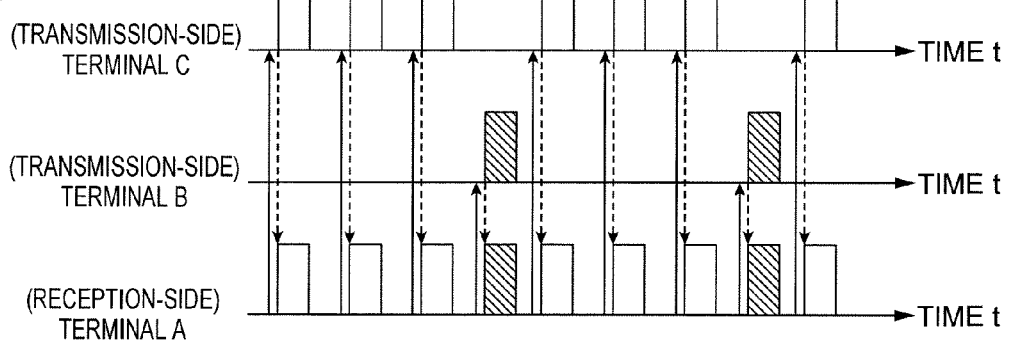

As shown in the area (a) of FIG. 1, a moving-picture image data-distribution method according to the present invention is applicable to a bidirectional data communication system such as a video teleconference system comprising a plurality of information terminals connected to a network. The bidirectional data communication system comprises a network 100 and a plurality of information terminals individually connected to the network 100. In the following description, the information terminals connected to the network 100 will respectively be denoted as terminal A 110, terminal B 120, and terminal C 130. In addition, each of the terminal A 110, the terminal B 120, and the terminal C 130 interconnected via the network 100 in this manner can be both a reception destination and a transmission source with respect to moving-picture image data distributed over the network 100.

Transmission/reception 100a (including transmission requirement and data distribution) of visual information such as moving-picture image data is performed via the network 100 between the terminal A 110 and the terminal B 120 which constitute a part of the bidirectional data communication system. In a similar manner, transmission/reception 100b of visual information such as moving-picture image data is performed via the network 100 between the terminal A 110 and the terminal C 130. Transmission/reception 100c (including transmission requirement and data distribution) of visual information such as moving-picture image data is performed via the network 100 between the terminal B 120 and the terminal C 130.

Moreover, moving-picture image data that is applied in the moving-picture image data-distribution method has a frame structure where respective image frames or frame groups may be compressed/decompressed independently from adjacent image frames or frame groups without being compressed in a time axis direction. However, for the sake of simplicity, the respective embodiments will be explained by limiting moving-picture image data to moving-picture image data according to the JPEG-format.

Figure 3:
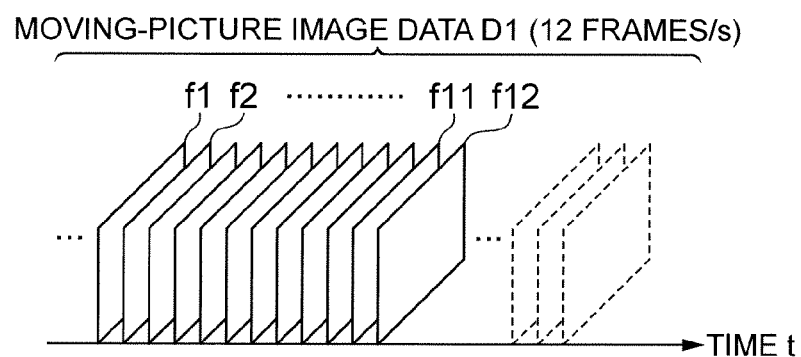
FIG. 3 is a view for explaining an example of moving-picture data (for example, a data structure of Motion-JPEG 2000 constituted by image frames of the JPEG 2000 standard) included in visual information that is distributed in the bidirectional data communication system shown in FIG. 1.

In the bidirectional data communication system shown in the area (a) of FIG. 1, visual information is transmitted/received among the respective terminals. In this case, besides moving-picture image data and voices of operators or the like of the respective information terminals, visual information to be transmitted/received includes still image data, text data, and other information that may contribute to bidirectional communication. In particular, as shown in FIG. 3, moving-picture image data included in visual information is moving-picture image data D1 constituted by 12 image frames f1 to f12 per unit time (s), wherein the image frames are arranged along a time axis t without being compressed in a direction along the time axis t and each image frame is individually compressed/decompressed. Moreover, FIG. 3 is a view for explaining an example of moving-picture data (for example, a Motion-JPEG 2000 data structure constituted by image frames according to the JPEG 2000 standard) included in visual information that is distributed in the bidirectional data communication system shown in FIG. 1.

Such moving-picture image data D1 can also be compressed in the direction of the time axis t such as utilizing differential information between adjacent image frames. For example, the moving-picture image data D1 that is a distribution object includes moving-picture image data according to the Motion-JPEG (or Motion-JPEG 2000) system.

Moving-picture image data according to the Motion-JPEG (or Motion-JPEG 2000) system has a lower compression efficiency at a same bit rate as compared to moving-picture image data according to the MPEG system but enables an arbitrary image frame to be separated from other image frames so as to be individually edited. In addition, such moving-picture image data only applies a light load on each terminal during encoding/decoding and enables real-time encoding with relatively simple equipment.

Figure 4:
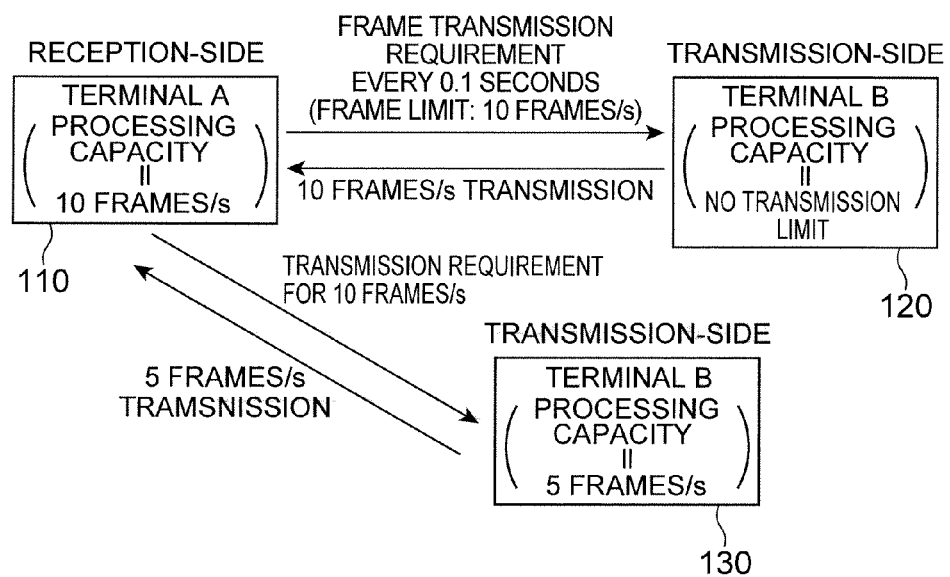
FIG. 4 is a block diagram for explaining a procedure for moving-picture image data distribution among the respective information terminals in the bidirectional data communication system shown in FIG. 1.
Figure 5:
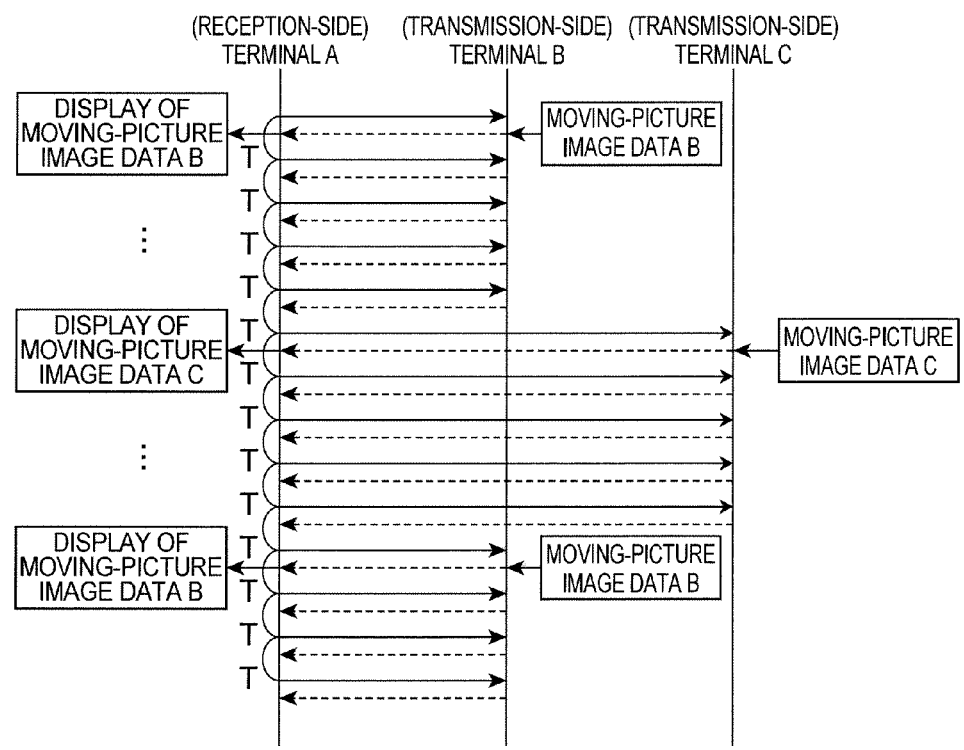
FIG. 5 shows a communication control sequence among the respective information terminals in the bidirectional data communication system shown in FIG. 1.

Next, the moving-picture image data-distribution method according to the present invention will be explained detail with reference to FIGS. 4 and 5. FIG. 4 is a block diagram for explaining a distribution procedure of the moving-picture image data D1 among the respective terminals. FIG. 5 shows a communication sequence among the respective terminals.

In the following description, the terminal A 110 is assumed to be a reception-side information terminal (hereinafter, simply denoted as the reception-side terminal A 110), the terminal B 120 and the terminal C 130 are assumed to be transmission-side information terminals (hereinafter, simply denoted as the transmission-side terminal B 120 and the transmission-side terminal C 130), and reception timings are assumed to be controlled by the reception-side terminal A 110. In addition, when repetitively issuing a moving-picture image data-transmission requirement to the transmission-side terminal B 120 or the transmission-side terminal C 130 that is a transmission source at a regular time interval T, the reception-side terminal A 110 calculates, as reception-limit information, a receivable data amount at the moment where the transmission requirement is made. Such a receivable data amount of the reception-side terminal A 110 is whichever data amount is less of a receivable image frame amount attributable to network band limitation and an own permissible load amount for image frame display processing. Furthermore, reception-limit information transmitted from the reception-side terminal A 110 to the transmission-side terminals B 120 and C 130 includes, as a data structural element that is used as a basis for calculation of the data amount, at least one of the number of transmission/reception units per unit time regarding image frames, an image resolution, and the number of bits per pixel. However, in the following description, for the sake of simplicity, reception-limit information will be restricted to the number of image frames to be transmitted per unit time.

In the moving-picture image data distribution method according to the present invention, during a moving-picture image data distribution operation from the transmission-side terminal B 120 to the reception-side terminal A 110 and a moving-picture image data distribution operation from the transmission-side terminal C 130 to the reception-side terminal A 110, transmission requirement and image frame distribution are performed in accordance with the number of frames processable by each other.

In particular, as shown in FIG. 5, the reception-side terminal A 110 repetitively issues a moving-picture image data-transmission requirement to the transmission-side terminal B 120 or the transmission-side terminal C 130 that is a transmission source at a regular time interval T. In doing so, the transmission-side terminal B 120 or the transmission-side terminal C 130 is sequentially notified of the number of frames processable per unit time (s) within an own permissible load range of image frame display processing at the present time (which can be calculated based on a band limitation of the network 100), as reception-limit information. On the other hand, having received the transmission requirement, the transmission-side terminal B 120 and the transmission-side terminal C 130 transmit moving-picture image data of whichever number of frames is smaller of the number of frames per unit time (s) that falls within an own permissible load range of image frame transmission processing at the moment where the transmission requirement had been accepted and the number of frames per unit time (s) requested by the reception-side information terminal to the reception-side terminal A 110 that had made the transmission requirement.

In other words, as shown in FIG. 4, the reception-side terminal A 110 first confirms that its own permissible load range of image frame display processing at the present time is 10 frames/s, and sequentially notifies a transmission requirement (including a notification on a limitation of the number of transmission frames) to the transmission-side terminal B 120. The transmission-side terminal B 120 notified of the transmission requirement from the reception-side terminal A 110 confirms its own load state including background processing at the moment where the transmission requirement had been received and sets its own frame transmission capacity. For example, in the case shown in FIG. 4, since a transmission limit is not set as a processing capacity at the moment where the transmission requirement had been received from the reception-side terminal A 110, the transmission-side terminal B 120 is to transmit, to the reception-side terminal A 110, moving-picture image data at 10 frames/s that is the transmission requirement.

Meanwhile, in a case where a transmission requirement (limit of the number of receivable frames) of 10 frames/s is issued from the reception-side terminal A 110 to the transmission-side terminal C 130 in the same manner as the transmission-side terminal B 120, the transmission-side terminal C 130 confirms its own load state including background processing at the moment where the transmission requirement had been received and sets its own frame transmission capacity. For example, in the case shown in FIG. 4, since 5 frames/s is set as a processing capacity at the moment where the transmission requirement had been received from the reception-side terminal A 110, the transmission-side terminal C 130 is to transmit, to the reception-side terminal A 110, moving-picture image data at 5 frames/s although the transmission requirement is for 10 frames/s.

In this manner, during moving-picture image data distribution operations, the numbers of frames of the moving-picture image data that is a distribution object is dynamically determined in a state where respective processing loads of the reception-side terminal A 110, the transmission-side terminal B 120, and the transmission-side terminal C 130 are taken into consideration. Therefore, the respective processing loads of the reception-side terminal A 110, the transmission-side terminal B 120, and the transmission-side terminal C 130 interconnected via the network 100 may be reduced.

However, since moving-picture image data is distributed within permissible limits of the respective processing loads of the reception-side terminal A 110, the transmission-side terminal B 120, and the transmission-side terminal C 130, there may be cases where an intermediate image frame is not received during moving-picture display at the reception-side terminal A 110. In addition, there may be cases where an intermediate image frame is not transmitted during image distribution at arbitrary timings by the transmission-side terminal B 120 and the transmission-side terminal C 130. In order to enable video display at the reception-side terminal A 110 even under such communication environments, moving-picture image data D1 having a moving-picture format frame structure such as the JPEG 2000 standard is adopted as the moving-picture image data D1 that is a transmission/reception object.

Figure 6:
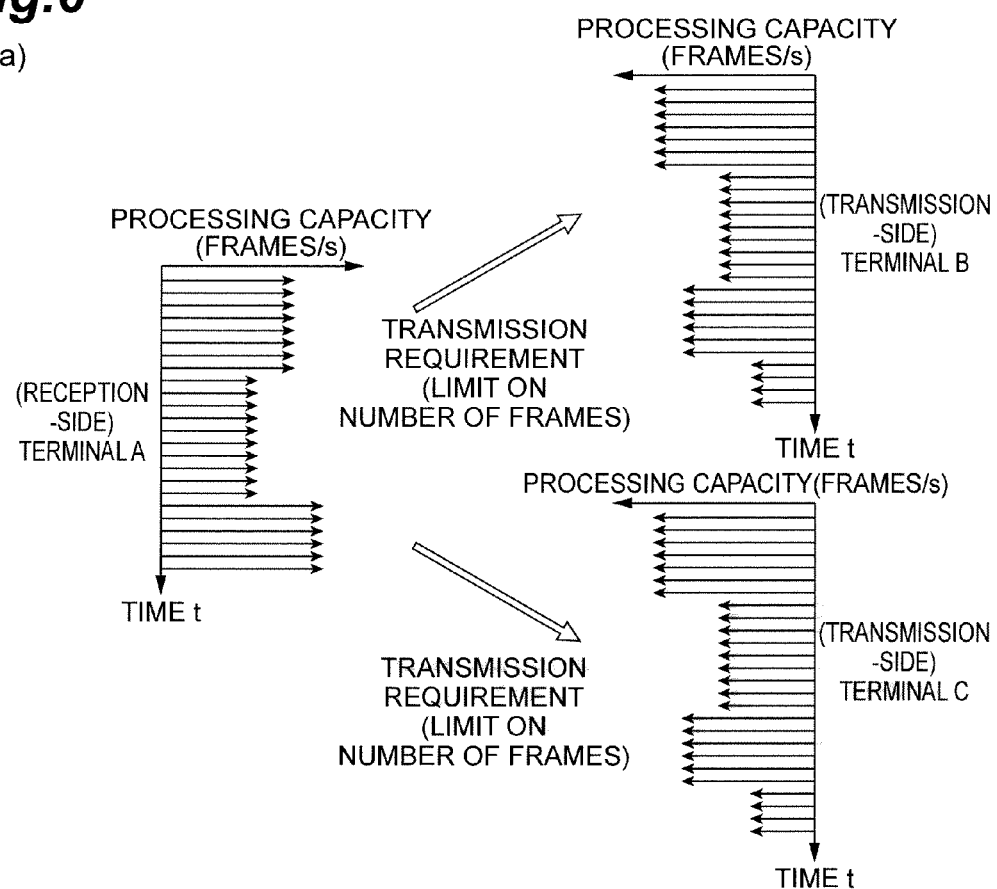
FIG. 6 is a view for explaining the moving-picture image data-distribution method according to the present invention from a perspective of processing loads at the respective information terminals.
Figure 6:
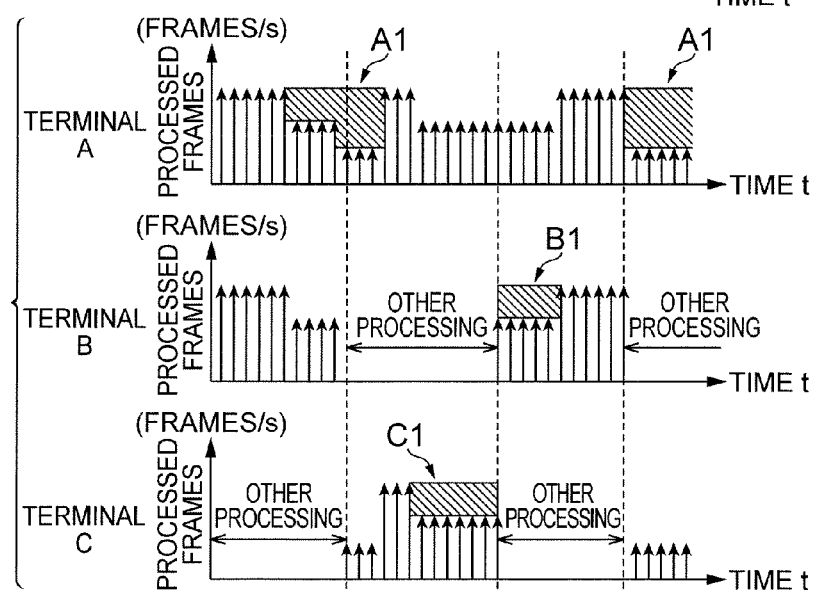

FIG. 6 is a view for explaining communication control procedures at the respective terminals described with reference to FIGS. 4 and 5 from a perspective of processing loads. In particular, the area (a) of FIG. 6 shows changes in respective processing capacities per a predetermined period of time T at the reception-side terminal A 110, the transmission-side terminal B 120, and the transmission-side terminal C 130 as numbers of processable image frames per unit time.

As shown in the area (a) of FIG. 6, the processing capacity (frames/s) of the reception-side terminal A 110 constantly changes as time t lapses. In a similar manner, the processing capacities (frames/s) of the transmission-side terminal B 120 and the transmission-side terminal C 130 also constantly change as time t lapses. Moreover, in the areas (a) and (b) in FIG. 6, a timing of load calculation at the reception-side terminal A 110 is approximately consistent with a timing of a transmission requirement from the reception-side terminal A 110 to the transmission-side terminal B 120 or the transmission-side terminal C 130. In addition, respective timings of load calculation at the transmission-side terminal B 120 and the transmission-side terminal C 130 are consistent with reception timings of transmission requirements from the reception-side terminal A 110.

The area (b) of FIG. 6 is a view for explaining, from a perspective of processing loads at the respective terminals, moving-picture image data distribution operations performed by the reception-side terminal A 110 respectively to the transmission-side terminal B 120 and the transmission-side terminal C 130 according to the communication control procedures shown in FIG. 5. As shown in the area (b) in FIG. 6, the reception-side terminal A 110 alternately transmits transmission requirements per a predetermined period of time such as per a regular time interval T to both the transmission-side terminal B 120 and the transmission-side terminal C 130. However, the regions A1 denote a difference between the number of frames in the transmission requirement from the reception-side terminal A 110 and the numbers of frames actually transmitted from both the transmission-side terminal B 120 and the transmission-side terminal C 130 in response to the transmission requirement (the number of processed frames not video-displayed at the reception-side terminal A 110 or an available capacity of image frame display of the reception-side terminal A 110).

On the other hand, when a transmission requirement from the reception-side terminal A 110 is received, the transmission-side terminal B 120 performs frame transmission to the reception-side terminal A 110 within a permissible range of its own processing capacity only during the reception of the transmission requirement and performs other processing during other time periods. During a time period where sufficient processing capacity for frame transmission processing can be secured, the transmission-side terminal B 120 distributes moving-picture image data of a number of frames in accordance with the transmission requirement from the reception-side terminal A 110. However, when a number of frames exceeding its own processing capacity is requested by the reception-side terminal A 110, the transmission-side terminal B 120 transmits moving-picture image data of a number of frames that is transmittable within its own processing capacity to the reception-side terminal A 110 even if the number of frames is equal to or smaller than the number of requested frames. The region B1 denotes the number of processed frames in an error transmission (a skipped transmission operation) during frame transmission from the transmission-side terminal B 120 to the reception-side terminal A 110.

In a similar manner, when a transmission requirement from the reception-side terminal A 110 is received, the transmission-side terminal C 130 performs frame transmission to the reception-side terminal A 110 within a permissible range of its own processing capacity only during the reception of the transmission requirement and performs other processing during other time periods. During a time period where sufficient processing capacity for frame transmission processing can be secured, the transmission-side terminal C 130 distributes moving-picture image data of a number of frames in accordance with the transmission requirement from the reception-side terminal A 110. However, when a number of frames exceeding its own processing capacity is requested by the reception-side terminal A 110, the transmission-side terminal C 130 transmits moving-picture image data of a number of frames that is transmittable within its own processing capacity to the reception-side terminal A 110 even if the number of frames is equal to or smaller than the number of requested frames. The region C1 denotes the number of processed frames in an error transmission (a skipped transmission operation) during frame transmission from the transmission-side terminal B 120 to the reception-side terminal A 110.

Figure 7:
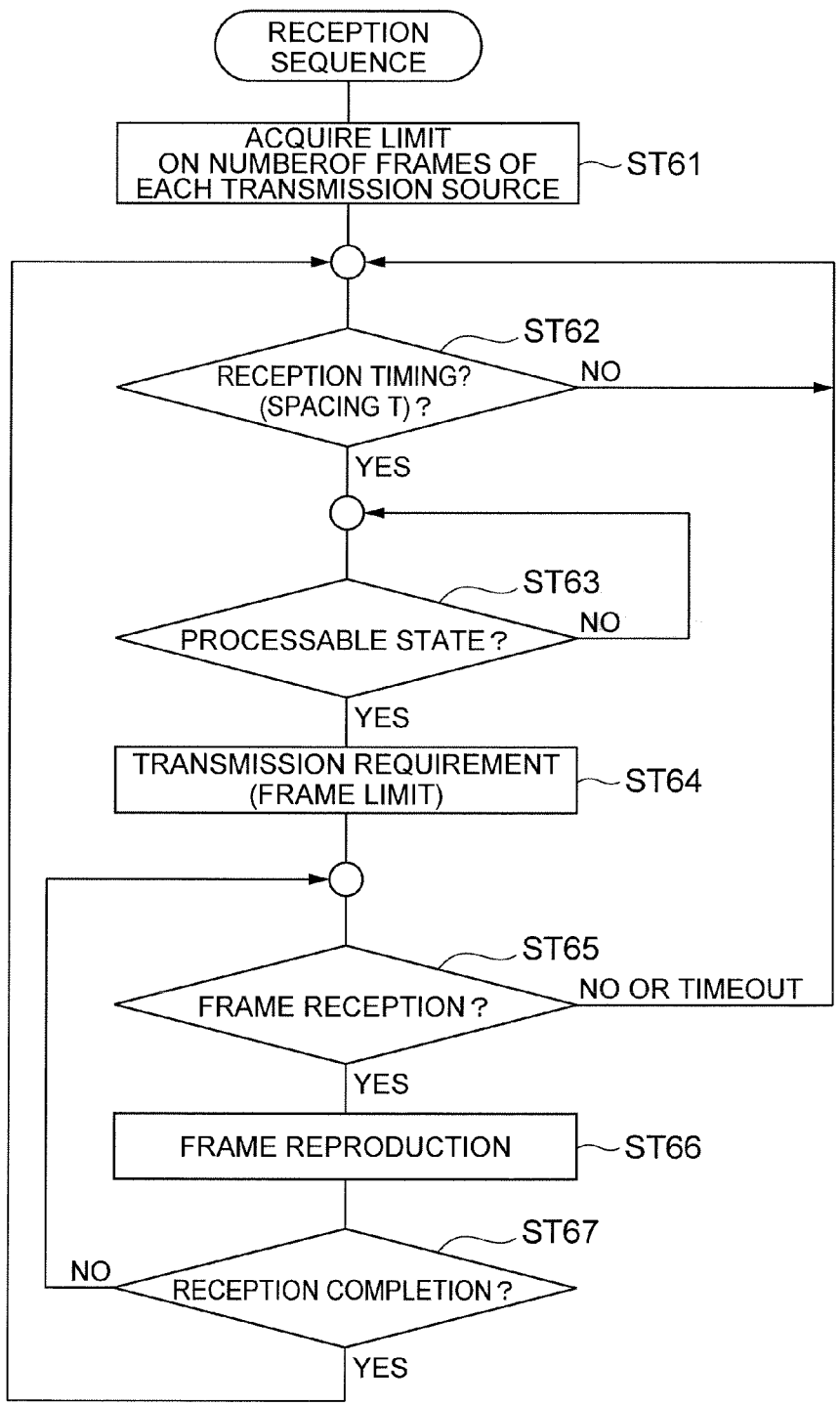
FIG. 7 is a flow chart for explaining a reception-side sequence in the moving-picture image data-distribution method according to the present invention.

Next, a reception-side sequence of the reception-side terminal A 110 will be explained in detail with reference to the flow chart shown in FIG. 7. The actual reception-side sequence, reception processing, and the like are to be executed at the control unit 110a.

In the moving-picture image data-distribution method according to the present invention, respective frame transmission limits are set in advance at the terminal A, the terminal B, and the terminal C (step ST61). In other words, each of the terminal A, the terminal B, and the terminal C notifies, in advance, transmission-limit information regarding the number of frames transmittable per unit time when the information terminal itself becomes a transmission source of moving-picture image data to the other terminals before transmitting the moving-picture image data. For example, in the case shown in FIG. 4, a transmission limit is not set in advance for the transmission-side terminal B 120 since background processing load is low. On the other hand, due to a high processing load, a transmission limit of 5 frames/s is set in advance for the transmission-side terminal C 130 and is respectively notified to the other terminals A 110 and B 120.

In this manner, by arranging upper limits of the number of transmittable image frames to be settable at the transmission-side terminal B 120 and the transmission-side terminal C 130, the reception-side terminal A 110 is to set the number of reception frames within these upper limits. Consequently, an increase in the processing load on the reception-side terminal A 110 due to moving-picture image data being sent to the reception-side terminal A 110 while disregarding load status can be avoided and, at the same time, the processing loads on transmission-side information terminals can be reduced. Moreover, both reception-side and transmission-side information terminals can actively manage a moving-picture image data distribution operation such as the reception-side terminal A 110 issuing a transmission requirement to a relevant transmission-side terminal only when it is determined that moving-picture image data transmitted from the transmission-side terminal B 120 or the transmission-side terminal C 130 can be processed while managing its own data processing (background data processing) in addition to the number of image frames to be video-displayed.

Subsequently, at the reception-side terminal A 110, during a reception timing of moving-picture image data (step ST62), its own processing capacity is confirmed (step ST63). At this point, when the reception-side terminal A 110 determines that reception is possible, the reception-side terminal A 110 notifies a moving-picture data transmission requirement of the number of frames within a processable range to either the transmission-side terminal B 120 or the transmission-side terminal C 130 (step ST64).

Upon receiving moving-picture image data of a predetermined number of frames from either the transmission-side terminal B 120 or the transmission-side terminal C 130 to which the transmission requirement had been notified, the reception-side terminal A 110 performs predetermined frame reproduction processing such as decompressing and sequentially displaying each image frame of the received moving-picture image data on a monitor (step ST66). Moreover, the frame reproduction operation (step ST66) is repeated until all image frames whose transmission had been requested are received (step ST67). In addition, when a certain amount of time lapses in a state where the reception-side terminal A 110 awaits reception of image frames transmitted from the transmission-side terminal B 120 or the transmission-side terminal C 130, a transmission requirement is once again notified from the reception-side terminal A 110 to the transmission-side terminal B 120 or the transmission-side terminal C 130.

Figure 8:
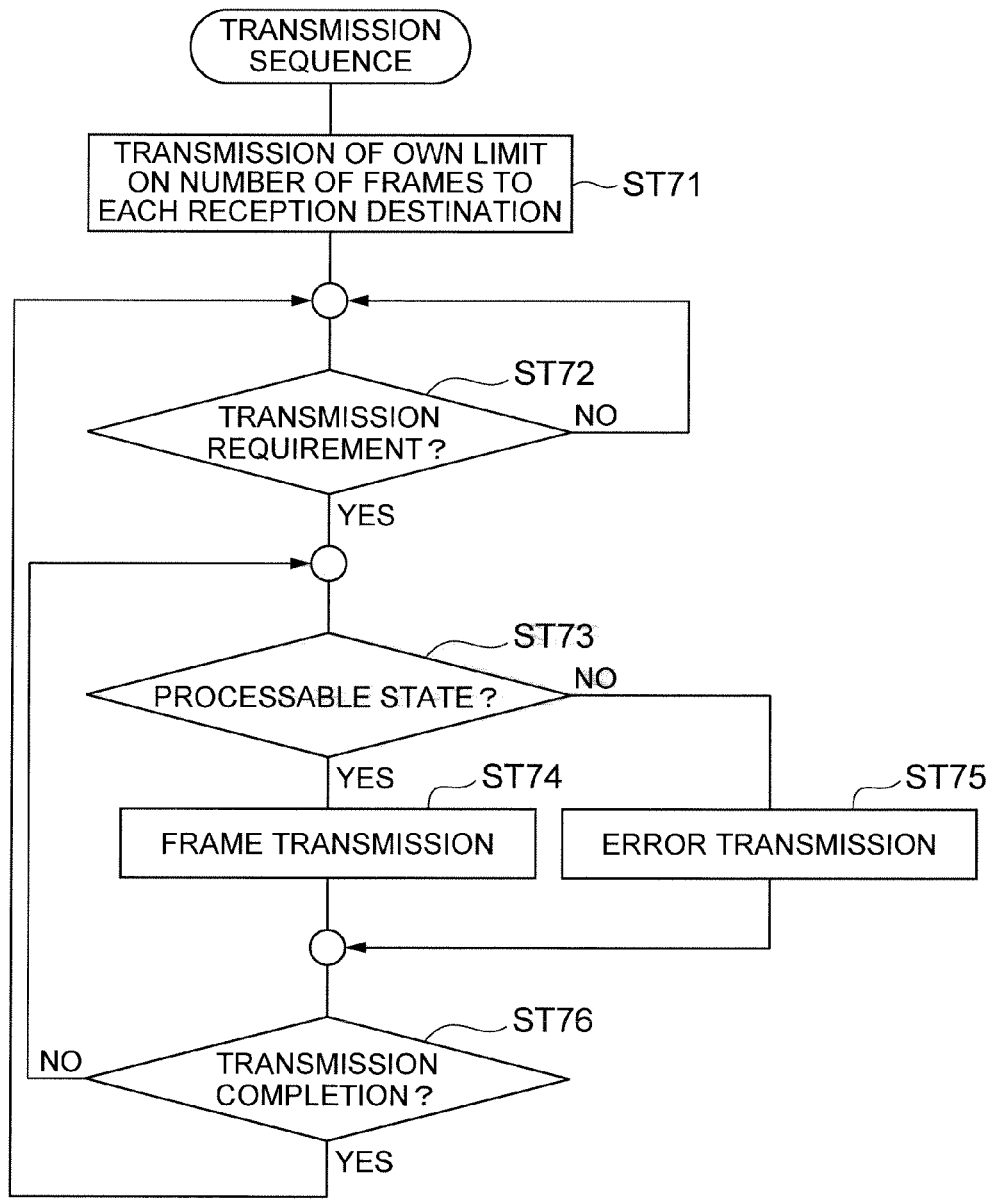
FIG. 8 is a flow chart for explaining a transmission-side sequence in the moving-picture image data-distribution method according to the present invention.

Next, respective transmission-side sequences and image frame transmission processing of the transmission-side terminal B 120 and the transmission-side terminal C 130 will be explained in detail with reference to the flow chart shown in FIG. 8 and to FIG. 9. The actual transmission-side sequences, transmission processing, and the like are to be executed at the control units 120*a* and 130*a*.

The terminal A, the terminal B, and the terminal C each notifies, in advance, transmission-limit information regarding the number of frames transmittable per unit time when the information terminal itself becomes a transmission source of moving-picture image data to the other terminals before transmitting the moving-picture image data (step ST71). In an embodiment such as shown in FIG. 4, since the terminal B 120 and the terminal C 130 are transmission sources, each of the transmission-side terminal B 120 and the transmission-side terminal C 130 notifies a transmission limit to the other terminals and awaits a transmission requirement from the reception-side terminal A 110 (step ST72).

For example, assuming that a transmission requirement is notified from the reception-side terminal A 110 to the transmission-side terminal B 120, the transmission-side terminal B 120 first confirms its own processing capacity (step ST73). Subsequently, either frame transmission to the reception-side terminal A 110 (step ST74) or error transmission processing signifying a skipped transmission (step ST75) is performed. The frame transmission processing is performed as shown in FIG. 9. In the frame transmission processing shown in FIG. 9, it is assumed that a transmission requirement for 5 frames/s is notified from the reception-side terminal A 110 to the transmission-side terminal B 120. In addition, it is assumed that the transmission capacity of the transmission-side terminal B 120 at this time is 5 frames/s.

Figure 9:
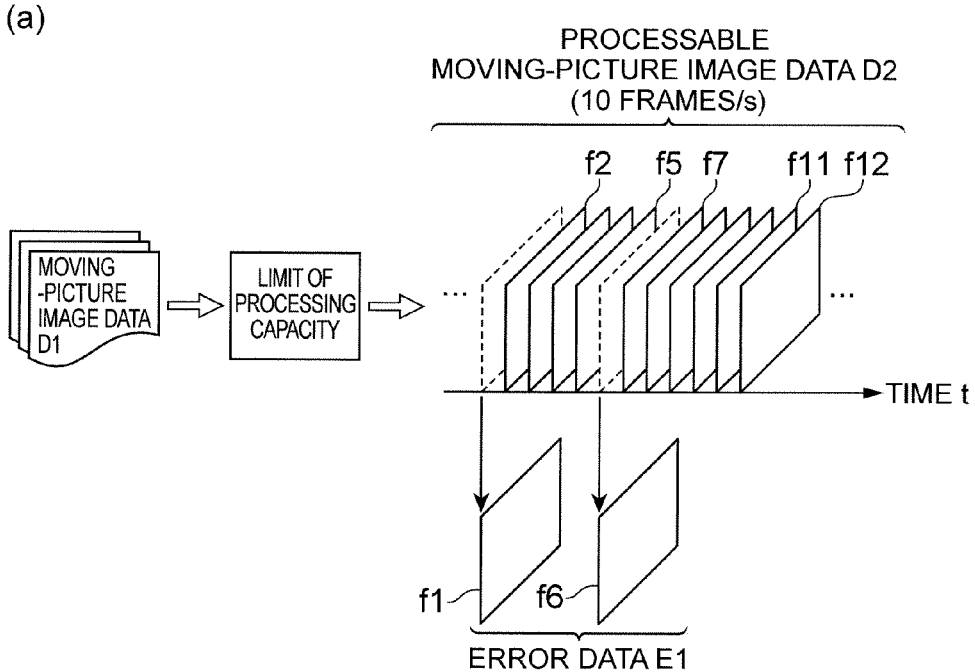
FIG. 9 is a view for explaining the transmission-side sequence in the moving-picture image data-distribution method according to the present invention from a perspective of visual information or, more particularly, from a perspective of control of the number of transmission image frames (load control).
Figure 9:
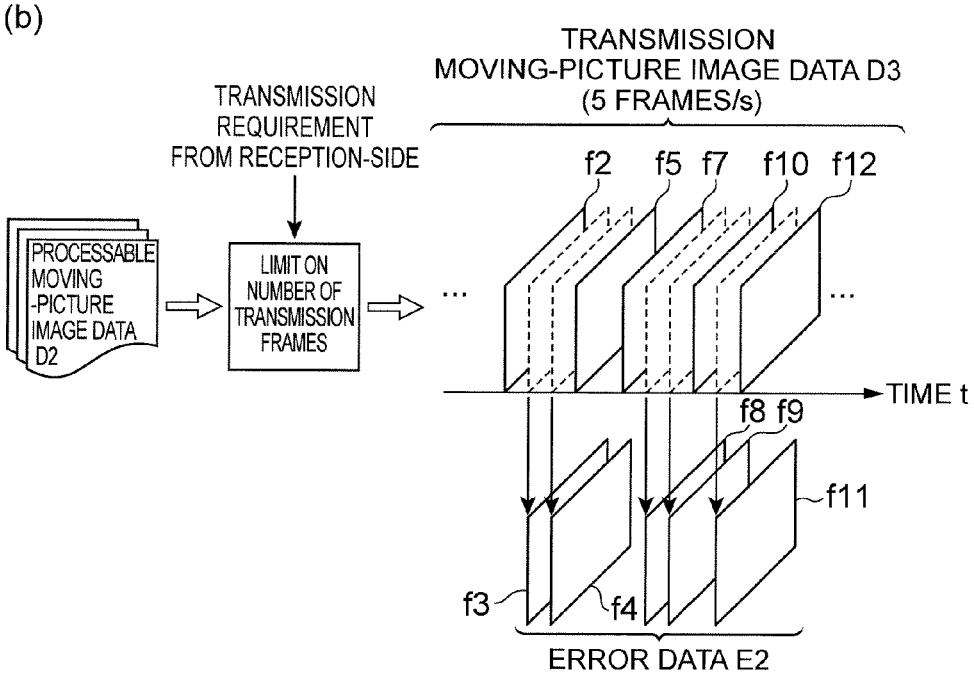

In specific frame transmission processing (steps ST73 to ST75), as shown in FIG. 9(*a*), the transmission-side terminal B 120 first generates processable moving-picture image data D2 (10 frames/s) by eliminating, in accordance with its own frame transmission capacity, image frames f1 and f6 as error data E1 from image frames f1 to f12 that constitute moving-picture image data D1 (12 frames/s) prepared in advance. Furthermore, as shown in the area (b) of FIG. 9, the transmission-side terminal B 120 further eliminates image frames f3, f4, f8, f9, and f11 as error data E2 from the moving-picture image data D2 (image frames f2, . . . , f5, f7, . . . , f12) whose transmission can be processed by the transmission-side terminal B 120 so as to accommodate the frame limit in the transmission requirement notified from the reception-side terminal A 110. Accordingly, transmission moving-picture image data D3 (moving-picture image data of 5 frames/s constituted by the image frames f2, f5, f7, f10, and f12) is generated. The transmission-side terminal B 120 transmits the transmission moving-picture image data D3 to the reception-side terminal A 110 that had notified the transmission requirement.

Upon conclusion of the frame transmission processing described above (step ST76), the transmission-side terminal B 120 stands by until a next transmission requirement is notified (step ST72).

As described above, in the moving-picture image data-distribution method according to the present invention, the number of image frames of moving-picture image data to be distributed can be dynamically adjusted according to an uneven distribution status of processing loads of a plurality of information terminals interconnected via a network or to a bandwidth status of the connected network. Therefore, moving-picture image data can be distributed in real-time without being affected by an uneven distribution of processing loads among the plurality of information terminals. In addition, by adopting moving-picture image data according to the Motion-JPEG system and the like as moving-picture image data to be transmitted/received, even when the number of image frames or the like constituting the moving-picture image data increases/decreases frequently, the impact on real-time moving-picture image data distribution among the respective information terminals can be effectively reduced.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

DESCRIPTION OF THE REFERENCE NUMERALS

100: network; 110, 120, 130: information terminal (PC); and 110*a*, 120*a*, 130*a*: control unit (CPU).

The invention claimed is:

1. A moving-picture image data-distribution method comprising:
transmitting/receiving moving-picture image data constituted by a plurality of image frames among a plurality of information terminals interconnected via a network, wherein
in a distribution operation of the moving-picture image data from a transmission-side information terminal to a reception-side information terminal as a mode of bidirectional data communication among the plurality of information terminals,
the transmission-side information terminal to be a transmission source notifies transmission-limit information thereof to the reception-side information terminal, before transmitting the moving-picture image data to the reception-side information terminal, the transmission-limit information indicating an upper limit of the number of transmission/reception units regarding image frames which can be transmitted per unit of time,
the reception-side information terminal issues a plurality of transmission requirements for moving-picture image data to the transmission-side information terminal in response to the notified transmission-limit information, until next transmission-limit information is notified, and when the reception-side information terminal repetitively issues the transmission requirement to the transmission-side information terminal, with reception of the moving-picture image data from the transmission-side information terminal, the reception-side information terminal calculates, in advance, at least one data amount of a receivable amount of image frames attributable to a band limitation of the network at the moment where the transmission requirement is issued and an own permissible load amount of image frame display processing, and notifies the transmission-side information terminal of an upper limit of at least any one of the data amount and a data structural element that is used as a basis for calculation of the data amount, as reception-limit information, wherein the data structural element includes at least any of the number of transmission/reception units per unit time regarding image frames, an image resolution, and the number of bits per pixel, wherein the moving-picture image data is constituted by a plurality of frame groups each of which includes at least one image frame and can be reproduced independently from a previously-positioned frame group in a time axis direction, and wherein the transmission/reception units regarding image frames correspond to the respective frame groups constituting the moving-picture image data.

2. A moving-picture image data-distribution method according to claim 1, wherein the transmission-side information terminal having received a transmission requirement from the reception-side information terminal transmits, to the reception-side information terminal that has issued the transmission requirement, moving-picture image data whose data amount is limited in accordance with at least any one of a data amount that falls within an own permissible load range at the moment where the transmission requirement had been received and the data amount requested by the reception-side information terminal, with respect to a data structural element indicated in the received reception-limit information.

3. A moving-picture image data-distribution method according to claim 1, wherein during a distribution operation of the moving-picture image data from two or more transmission-side information terminals to a reception-side information terminal as a mode of bidirectional data communication among the plurality of information terminals, and wherein the reception-side information terminal transmits a transmission requirement signal to any of the two or more transmission-side information terminals at an own timing where image frame display can be processed.

4. A moving-picture image data-distribution method according to claim 3, wherein among the two or more transmission-side information terminals, only the transmission-side information terminal having received the transmission requirement signal transmitted at the timing transmits, to the reception-side information terminal, moving-picture image data of the data amount requested by the reception-side information terminal, and the remaining transmission-side information terminal enters a transmission stand-by state of moving-picture image data until a transmission requirement to the information terminal itself is received.

5. A moving-picture image data-distribution method comprising:

transmitting/receiving moving-picture image data constituted by a plurality of image frames among a plurality of information terminals interconnected via a network, wherein:

in a distribution operation of the moving-picture image data from a transmission-side information terminal to a reception-side information terminal as a mode of bidirectional data communication among the plurality of information terminals, the transmission-side information terminal to be a transmission source notifies transmission-limit information thereof to the reception-side information terminal, before transmitting the moving-picture image data to the reception-side information terminal, the transmission-limit information indicating an upper limit of the number of transmission/reception units regarding image frames which can be transmitted per unit of time, the reception-side information terminal issues a plurality of transmission requirements for moving-picture image data to the transmission-side information terminal in response to the notified transmission-limit information, until next transmission-limit information is notified, and when the reception-side information terminal repetitively issues the transmission requirement to the transmission-side information terminal, with reception of the moving-picture image data from the transmission-side information terminal, the reception-side information terminal calculates, in advance, at least one data amount of a receivable amount of image frames attributable to a band limitation of the network at the moment where the transmission requirement is issued and an own permissible load amount of image frame display processing, and notifies the transmission-side information terminal of an upper limit of at least any one of the data amount and a data structural element that is used as a basis for calculation of the data amount, as reception-limit information, wherein the data structural element includes at least any of the number of transmission/reception units per unit time regarding image frames, an image resolution, and the number of bits per pixel, wherein the moving-picture image data is constituted by image frames each of which can be reproduced independently from a previous image frame without being compressed in a time axis direction, and wherein the transmission/reception units regarding image frames correspond to the respective image frames constituting the moving-picture image data, wherein the moving-picture image data is constituted by image frames each of which can be reproduced independently from a previous image frame without being compressed in a time axis direction, and wherein the transmission/reception units regarding image frames correspond to the respective image frames constituting the moving-picture image data.

* * * * *